US012704399B2

(12) United States Patent
Grohman et al.

(10) Patent No.: US 12,704,399 B2
(45) Date of Patent: Aug. 11, 2026

(54) WEIGHT MEASUREMENT AND CARGO TRACKING SYSTEMS AND METHODS

(71) Applicant: I.D. SYSTEMS, INC., Woodcliff Lake, NJ (US)

(72) Inventors: Wojciech Grohman, Woodcliff Lake, NJ (US); Lior Musi, Koha Yai'r Tzur Yigal (IL); Shalom Boruch Beitz, Kiryat Ono (IL); William Ely, Roanoke, TX (US)

(73) Assignee: I.D. SYSTEMS, INC., Woodcliff Lake, NJ (US)

( * ) Notice: Subject to any disclaimer, the term of this patent is extended or adjusted under 35 U.S.C. 154(b) by 342 days.

(21) Appl. No.: 17/865,505

(22) Filed: Jul. 15, 2022

(65) Prior Publication Data

US 2023/0014528 A1 Jan. 19, 2023

Related U.S. Application Data

(60) Provisional application No. 63/270,954, filed on Oct. 22, 2021, provisional application No. 63/222,402, filed on Jul. 15, 2021.

(51) Int. Cl.
*G01G 19/12* (2006.01)
*G01G 23/01* (2006.01)

(52) U.S. Cl.
CPC ............. *G01G 19/12* (2013.01); *G01G 23/01* (2013.01)

(58) Field of Classification Search
None
See application file for complete search history.

(56) References Cited

U.S. PATENT DOCUMENTS 5,478,974 A * 12/1995 O'Dea ................... G01G 23/01 177/25.14
5,780,782 A * 7/1998 O'Dea ................... G01G 19/08 177/136
10,132,674 B2 * 11/2018 Watanabe .............. G01G 19/08
10,551,241 B2 2/2020 Mount
11,975,724 B2 * 5/2024 Rogness ............... B60W 40/13
2009/0261981 A1 * 10/2009 Jones ..................... G06Q 10/06 340/666

FOREIGN PATENT DOCUMENTS

CN 107356311 A * 11/2017 ............. G01G 19/08
CN 111928931 A * 11/2020 ............. G01G 19/62
EP 0625697 B1 3/1999

* cited by examiner

*Primary Examiner* — Peter J Macchiarolo
*Assistant Examiner* — Jermaine L Jenkins
(74) *Attorney, Agent, or Firm* — TROUTMAN PEPPER LOCKE LLP; James E. Schutz; Korbin Blunck

(57) ABSTRACT

The disclosed technology relates to systems and methods for weighing transportation vehicles and cargo and determining their load state. The disclosed technology can include a sensor controller configured to received one or more sensor readings from weight sensors on a cargo vehicle. The sensor controller can determine an inclination and/or deflection of the cargo vehicle and modify the sensor readings based on the inclination and/or deflection. The sensor controller can calculate a weight of cargo carried by the cargo vehicle based on the modified sensor readings.

20 Claims, 9 Drawing Sheets

400

410 Receive sensor reading

420 Determine inclination

430 Modify sensed weight

440 All axels present?

Yes

No

450 Calculate total weight

460 Calculate approximate weight

470 Report weight

500

700

800

WEIGHT MEASUREMENT AND CARGO TRACKING SYSTEMS AND METHODS

CROSS REFERENCE TO RELATED APPLICATIONS

This application claims the benefit of U.S. Provisional Application No. 63/222,402, filed 15 Jul. 2021, and U.S. Provisional Application No. 63/270,954, filed 22 Oct. 2021, each of which is incorporated herein by reference in its entirety as if fully set forth below.

FIELD

The present disclosure relates to weight measurement, and, more particularly, to systems and methods for weighing transportation vehicles and cargo and determining their load state.

BACKGROUND

The operation of an overloaded vehicle causes damage to roads and bridge structures. Accordingly, many jurisdictions require cargo transportation vehicles to meet certain weight requirements, which differ from location to location. For instance, neighboring states may have materially different weight standards for cargo trucks and containers.

In order to meet these requirements, various means of measuring cargo have been introduced. Related art systems often require a plurality of sensors to be mounted on either the vehicle (e.g., one or more per axle) and/or in multiple points within or beneath the cargo container. However, the requirement of maintaining multiple devices can be costly, cumbersome and inherently less reliable. Moreover, the systems must be periodically and repeatedly re-calibrated to ensure continuing accuracy of their measurements. Many require wired connection to off-vehicle calibration equipment to perform the re-calibration.

Accordingly, there is needed improvements to cargo weight measurement, as well as improvements to monitoring a container, determining whether a chassis is mounted, and determining whether a chassis has a loaded or empty container thereon. Aspects of the present disclosure address one or more of these and other features.

SUMMARY

The present disclosure relates to weight measurement, and, more particularly, to systems and methods for weighing transportation vehicles and cargo and determining their load state. The disclosed technology can include a sensor controller having a processor and a memory. The memory can have computer program code stored thereon that, when executed by the processor, can control the processor to receive weight data from one or more weight sensors disposed on a cargo vehicle, determine that cargo has been removed from the cargo vehicle, and determine an empty weight of the cargo vehicle based on the weight data. The computer program code stored thereon that, when executed by the processor, can control the processor to calibrate the one or more weight sensors based on the empty weight.

The computer program code, when executed by the processor, can further control the processor to determine an inclination or deflection of the cargo vehicle, and calculate a weight of cargo carried by the cargo vehicle based on the weight data and the inclination or deflection of the cargo.

The computer program code, when executed by the processor, can further control the processor to calibrate the one or more weight sensors based on the empty weight and the inclination of the cargo vehicle.

The weight data can be received from a plurality of weight sensors. At least one weight sensor of the plurality of weight sensors can be disposed on each axle of the cargo vehicle.

The computer program code, when executed by the processor, can further control the processor to determine that a cargo container has been removed from the cargo vehicle; determine, based on the weight data, an empty weight of the cargo vehicle; and calibrate the weight sensors based on the empty weight.

The computer program code, when executed by the processor, can further control the processor to verify the cargo vehicle is empty, before calibrating the weight sensors, by monitoring vibrations of the cargo vehicle when the cargo vehicle is in motion. The computer program code, when executed by the processor, can further control the processor to determine that a cargo container has been removed from the cargo vehicle by monitoring a Global Positioning System (GPS) signal strength from a GPS receiver disposed on the cargo vehicle, detecting a change in the GPS signal strength, and determining that the change in the GPS signal strength is indicative of removal of the cargo container.

The computer program code, when executed by the processor, can further control the processor to monitor weight data from the one or more weight sensors over time and determine cargo unloading times based on changes to the weight data while the cargo vehicle is stopped. The computer program code, when executed by the processor, can further control the processor to monitor weight data from the one or more weight sensors over time and determine cargo loading times based on changes to the weight data while the cargo vehicle is stopped.

The computer program code, when executed by the processor, can further control the processor to detect loading or unloading of the cargo vehicle based on determining a pattern of changes to the weight data. The computer program code, when executed by the processor, can further control the processor to detect unauthorized loading or unloading of the cargo vehicle based on a time of the detected loading or unloading, on a location of the detected loading or unloading, or a predetermined weight of cargo on the cargo vehicle.

The computer program code, when executed by the processor, can further control the processor to extrapolate total weight of the cargo vehicle based on the weight data.

The computer program code, when executed by the processor, can further control the processor to compare the total weight of the cargo vehicle to a predetermined weight limit and, in response to determining that the total weight of the cargo vehicle is greater than or equal to the predetermined weight limit, output a notification indicative of the total weight of the cargo vehicle can be greater than or equal to the predetermined weight limit. The predetermined weight limit can be based on a weight limit of a location through which the cargo vehicle is expected to pass.

The sensor controller can determine the inclination and/or deflection of the cargo vehicle based on data received from an accelerometer.

The disclosed technology can include a system having a weight sensor disposed on a cargo vehicle and a controller. The controller can be in communication with the weight sensor and have a processor and a memory having instructions stored thereon that, when executed by the processor, cause the controller to receive first weight data from the weight sensor. The first weight data can be indicative of a weight of a cargo container at a first time. The instructions, when executed by the processor, can cause the controller to receive second weight data from the weight sensor. The second weight data can be indicative of a weight of a cargo container at a second time.

The instructions, when executed by the processor, can cause the controller to determine a change in weight of the cargo container based on the first weight data and the second weight data and determine whether the cargo container is loaded or unloaded based on the change in weight.

The instructions, when executed by the processor, can further cause the controller to determine an inclination and/or deflection of the cargo vehicle and calculate a weight of cargo carried by the cargo vehicle based on the first weight data, the second weight data, and the inclination add/or deflection.

The system can include a location sensor disposed on the cargo vehicle. The instructions, when executed by the processor, can further cause the controller to detect unauthorized loading or unloading of the cargo vehicle based on a location of the cargo vehicle.

The instructions, when executed by the processor, can further cause the controller to determine cargo loading or unloading times based on the first weight data and the second weight data while the cargo vehicle is stopped.

The instructions, when executed by the processor, further cause the controller to determine that the cargo container has been removed from the cargo vehicle, receive empty weight data from the weight sensor, determine, based on the empty weight data, an empty weight of the cargo vehicle, and calibrate the weight sensor based on the determined empty weight.

Additional features, functionalities, and applications of the disclosed technology are discussed in more detail herein.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
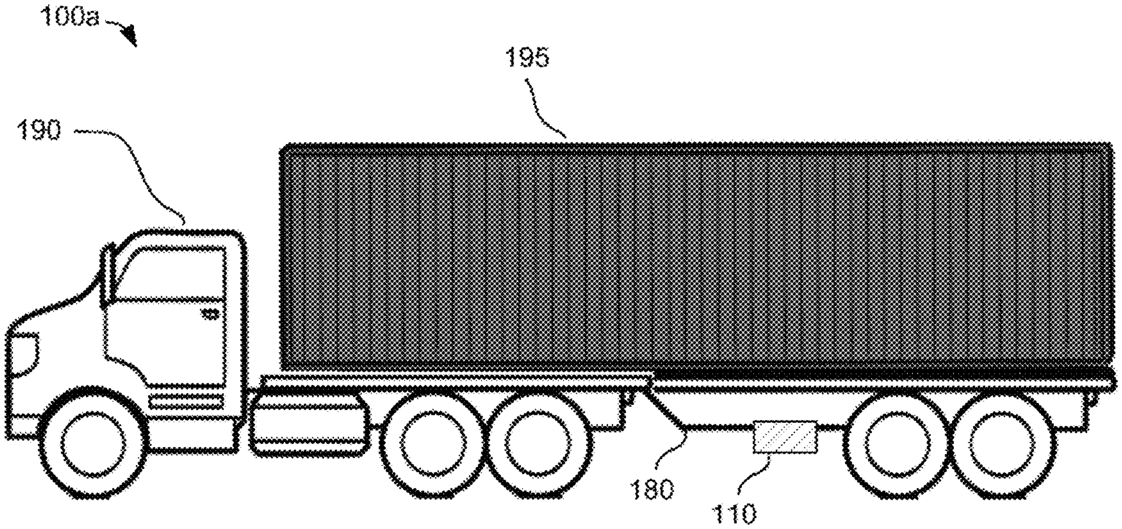
FIGS. 1A and 1B illustrate an example system environment for weight measurement systems according to aspects of the present disclosure.

The present disclosure can be understood more readily by reference to the following detailed description of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. Some example embodiments of the disclosed technology will be described more fully hereinafter with reference to the accompanying drawings. The disclosed technology might be embodied in many different forms and should not be construed as limited to the example embodiments set forth herein.

Although aspects of the present disclosure may be discussed with reference to specific embodiments utilizing a chassis, container, combination chassis and container, and/or trailer, one of ordinary skill will recognize that, except where not possible, aspects of the disclosure related to a chassis may be applied to a trailer, and vice versa.

Aspects of the present disclosure relate to systems and methods for providing weight sensing of cargo containers and cargo vehicles. In some cases, one or more weight sensors may be provided on one or more axles of a cargo vehicle (e.g., a cargo truck). The weight sensor may be, as non-limiting examples, a strain gauge, a vibrating strain gauge, a load cell, a mechanical sensor, including a displacement sensor, an ultrasonic sensor, an optical sensor, a magnetic sensor and a hydraulic sensor. The sensors usually measure one or both of the two measures of weight: the distance of the axle or the ground under the chassis to a plane related to the vehicle load, such as the floor of the container or van trailer, a cross member of the container, etc.; the deflection of the container or the axle under different weight. The weight sensor may send measurement readings (e.g., wirelessly or through a wired connection) to a sensor controller. The measurements may be sent periodically, perpetually (e.g., constantly or repetitively), and/or on demand. The sensor controller may include a tilt sensor (e.g., an accelerometer or a gyroscope) to determine an angle of the cargo truck. Based on the angle of the cargo truck and the weight sensor reading, the sensor controller may calculate the weight of the cargo.

In some cases, the sensor controller may include a location sensor such as a Global Positioning System (GPS) receiver. The sensor controller may monitor a strength of the GPS signal and, if the signal strength rapidly increases (e.g., beyond a predetermined threshold), sensor controller may determine that a cargo container has been removed from the cargo truck. The sensor controller may then automatically calibrate the weight sensors for the tare (e.g., unladen) weight. In some cases, the sensor controller may monitor the weight sensor readings over time. Based on the changes over time, the sensor controller may derive loading and unloading times. In some cases, the weight measurements may be combined with geolocation data to detect unauthorized loading and unloading of the cargo container.

Aspects of the present disclosure will now be discussed with reference to the figures. While aspects of the present disclosure are discussed in relation to using a wireless axle-mounted vibrating wire strain gauge weight measurement system, these are merely examples. One of ordinary skill will recognize that aspects of the present disclosure may be used in various wireless and wired weight measurement systems.

As used herein, the term "inclination" refers to an extent to which an object (e.g., chassis 180) is disposed at an angle relative to a horizontal plane. The term "deflection" refers to the extent to which an object (e.g. the chassis 180) can bend under weight creating a non-linear surface, usually of the floor of the container or trailer.

Figure 1B:
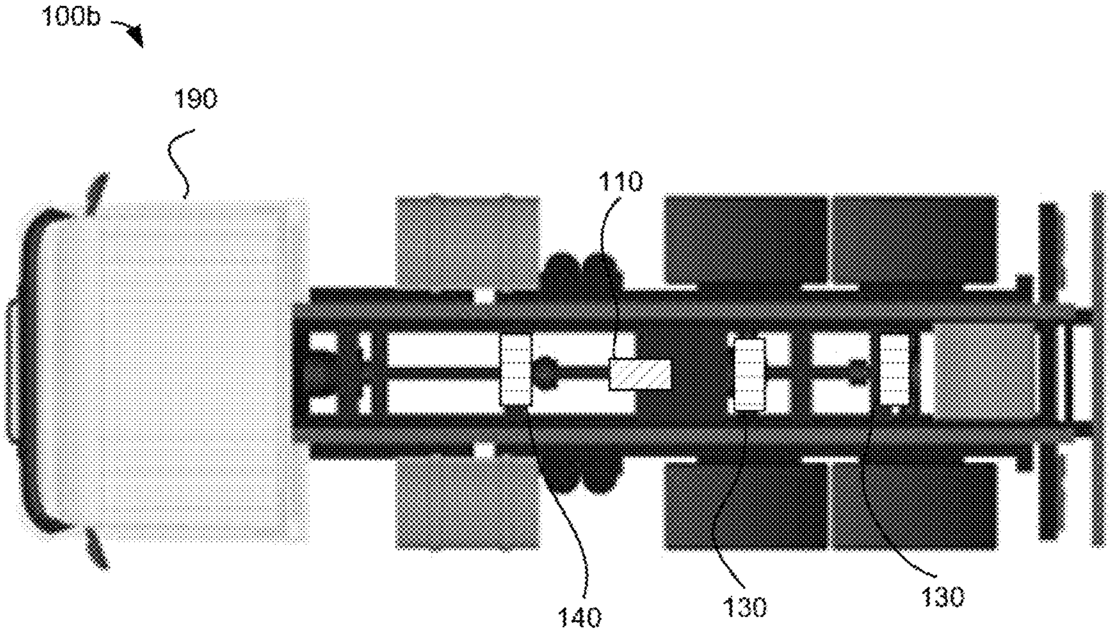

FIGS. 1A and 1B illustrate an example system environment 100 according to aspects of the present disclosure. Referring to FIGS. 1A and 1B, one or more weight sensors 130, a sensor controller 110 and telemetry unit 140 are attached to the chassis 180 attached to the tractor vehicle 190. As non-limiting examples, the weight sensor 130 may be, as non-limiting examples, a strain gauge, a vibrating strain gauge, a load cell, a mechanical sensor, a magnetic sensor, an ultrasonic sensor, an optical sensor, and a hydraulic sensor. The weight sensor 130 may send the measurement to a sensor controller 110. Sensor controller 110 may be connected to the weight sensor(s) 130 either wirelessly or via a wired connection. The measurements may be taken periodically, perpetually (e.g., constantly or repetitively), and/or on demand, depending on state of the vehicle, availability of power to the system and the control algorithm. For example, when cargo container 195 is placed on the chassis 180 being pulled by the vehicle 190, weight sensors 130 may sense the weight of the cargo container 195 and send the sensor reading to sensor controller 110. The weight sensor 130 may be attached to an axle of the chassis 180. In the case of a multi-axle chassis 180, weight sensors 130 may be attached to each axle of the chassis 180. The telemetry unit 140 may be responsible for general tracking of the asset and communicating to the remote server via a remote communication network such as a proprietary cellular, satellite network, or an ISM band via WiFi and similar technologies. It should be understood to those skilled in the art that the telemetry unit 140 and the sensor controller 110 can be separate devices communicating with each other over a short- or long-range communicating link that can be wired (e.g. RS-485, Power Line Carrier communication, Controller Area Network or the like) or wireless (e.g. Bluetooth Low Energy, any of the IEEE 802.15.4-based protocols, or the like), or that they are combined into a one device henceforth referred to as the sensor controller 110. When separated, the two devices can be mounted anywhere within the chassis 180, preferably with at least one of them mounted directly under the cargo container 195 to allow the container presence sensing.

It should be understood by those skilled in the art that the chassis 180 and container 195 can be substituted with a dry van, refrigerated van trailer, or the like. These trailers do not have separate cargo containers that can be lifted off their chassis. Instead, they form one inseparable unit. In the case of such a trailer, the disclosed invention is used to determine the weight of the cargo of the van. The container mount sensing feature does not apply in these cases.

Figure 9:
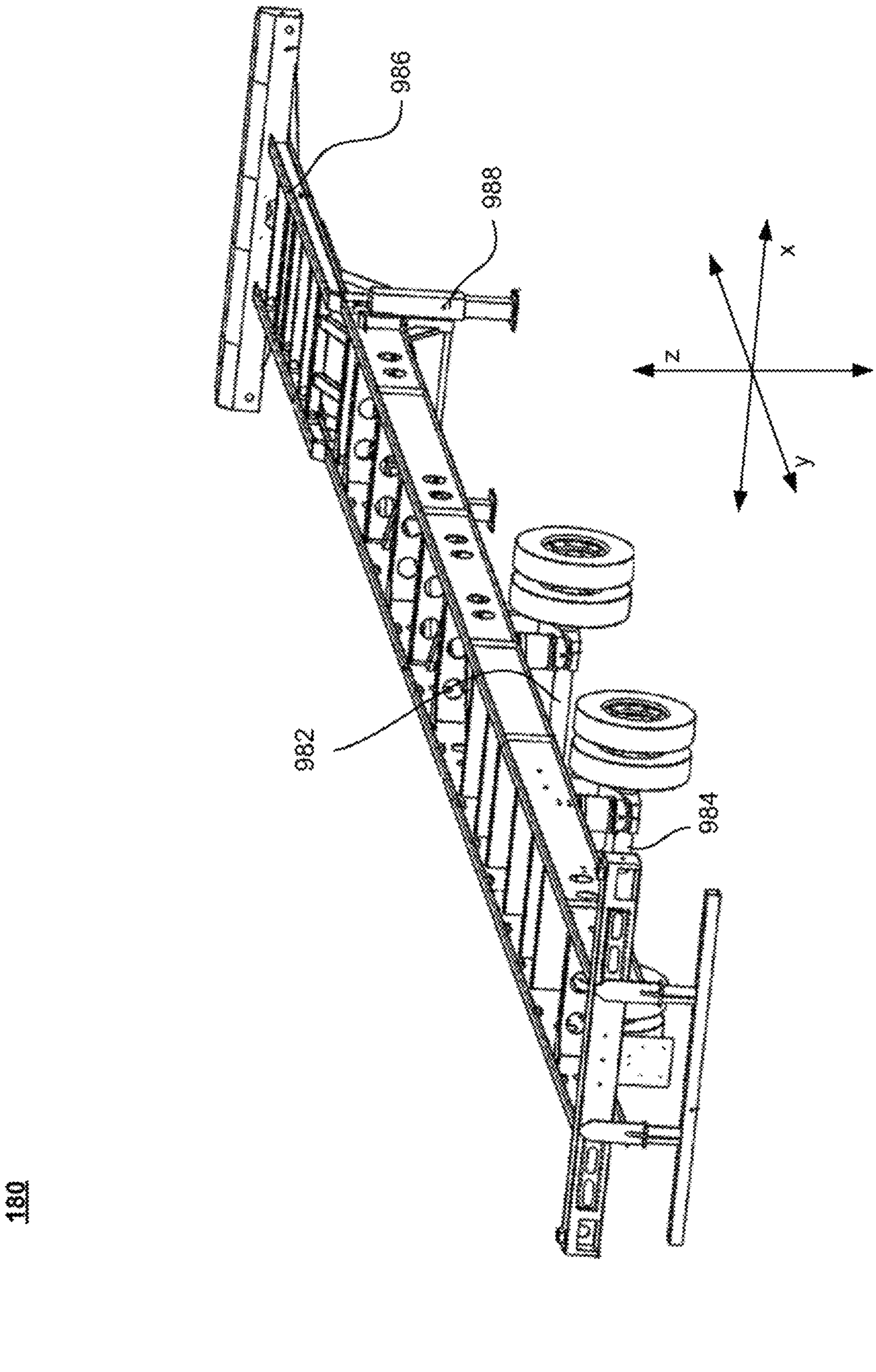
FIG. 9 illustrates a container-less chassis for reference.

FIG. 9 illustrates a chassis 180 for reference purposes. Chassis 180 includes a front axle 982, a rear axle 984, a fifth wheel 986, and landing gear 988. The x direction corresponds to a width of the chassis 180, the y direction corresponds to a length of the chassis 180, and the z direction corresponds to a height of the chassis 180.

Figure 2:
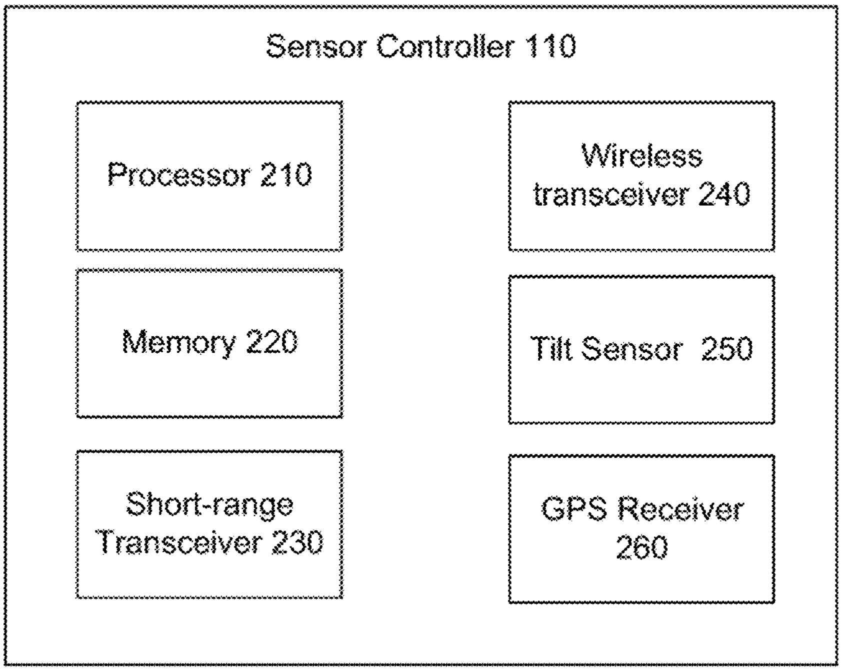
FIG. 2 is a block diagram of a sensor controller according to aspects of the present disclosure.

Referring to FIG. 2, sensor controller 110 may include a processor 210, a memory 220, a short-range and/or wired transceiver 230, a long-range transceiver 240, a tilt sensor 250, and a GPS receiver 260 (e.g., a positioning receiver or position sensor). Although short range transceiver 230, wireless transceiver 240, tilt sensor 250, and GPS receiver 260 may be combined in sensor controller 110, this is merely an example. One of ordinary skill will recognize in light of the present disclosure that various aspects of sensor controller 110 may be utilized in separate devices, such as the additional telemetry unit 140 and/or, in some implementations, not all aspects of sensor controller 110 may be implemented. For example, in some cases, aspects of sensor controller 110 may be implemented in a remote server (e.g., remote system 380 from FIG. 3).

Figure 3:
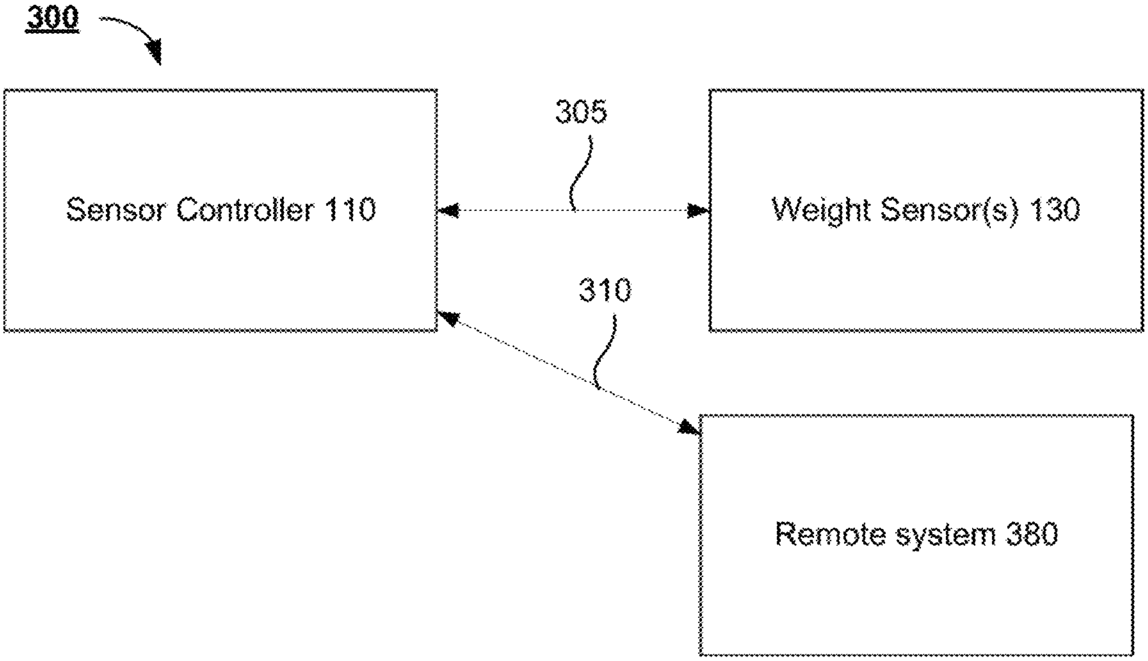
FIG. 3 illustrates an example communication environment for weight measurement systems according to aspects of the present disclosure.

Sensor controller 110 receives sensor readings from the weight sensors 130, e.g., via short-range transceiver 230 or through a dedicated wired link (see, e.g., 305 of FIG. 3). Processor 210 may process the received sensor readings to determine a current weight of the cargo container 195, combined chassis 180 and container 195, and weight at a given axle. Sensor controller 110 may then transmit the determined weight, or raw measurements for weight calculations, to a remote system 380 (see, FIG. 3) via wireless transceiver 240. If raw measurements are sent, the remote system 380 and/or a server may calculate the weight based thereon.

Referring to FIG. 3, FIG. 3 illustrates a system environment 300 in which aspects of the present disclosure may be implemented. As shown in FIG. 3, sensor controller 110 communicates with weight sensor(s) 130 via a wired or wireless communication link 305. Similarly, sensor controller 110 communicates with remote system 380 via wireless communication link 310. Remote system 380 may be, for example, a driver device (e.g., personal device), another device situated on the vehicle 190 or on the chassis 180, and/or a remote server. Wireless transceiver 240 may be a short-range transceiver (e.g., Bluetooth, NFC, one implementing IEEE 802.15.4 based protocol or WI-FI) or a long-range transceiver (e.g., sensing mobile data via a cellular or satellite link). In some cases, sensor controller 110 may only deliver the sensor readings to remote system 380 on request. In some cases, sensor controller 110 may store historical weight calculations or raw, or partially processed data and deliver remote system 380 the historical data upon request or periodically.

Referring back to FIG. 2, in some cases, sensor controller 110 may use tilt sensor 250 to determine an inclination of the chassis 180. As discussed above, weight sensor 130 may be disposed on one or more axles of the chassis 180. As compared to a flat or neutral orientation, when chassis 180 is on a downward slant, more weight may be sensed on the front axle (see, e.g., FIG. 9 (982)) of the chassis 180. Similarly, as compared to a flat or neutral orientation, when chassis 180 is on an upward slant, more weight may be sensed on a back axle (see, e.g., FIG. 9 (984)). Accordingly, in some cases, sensor controller 110 may utilize the tilt sensor 250 to calculate the weight of the cargo container 195, e.g., by adjusting the sensor readings to compensate for the tilt.

In some cases, sensor controller 110 may determine the calculation of the cargo container 195 weight over time based on historical weight sensing. For example, sensor controller 110 may monitor and track sensor readings from weight sensors 130 over time together with an inclination level from tilt sensor 250. Based on changes to the sensor readings as compared to the inclination, sensor controller 110 may determine a relationship between sensor readings and the tilt. This "training" may be done intentionally (e.g., as part of an installation process), or organically (e.g., by monitoring weight sensor 130 readings and tilt sensor readings 250 as the chassis 180 travels).

Figure 4:
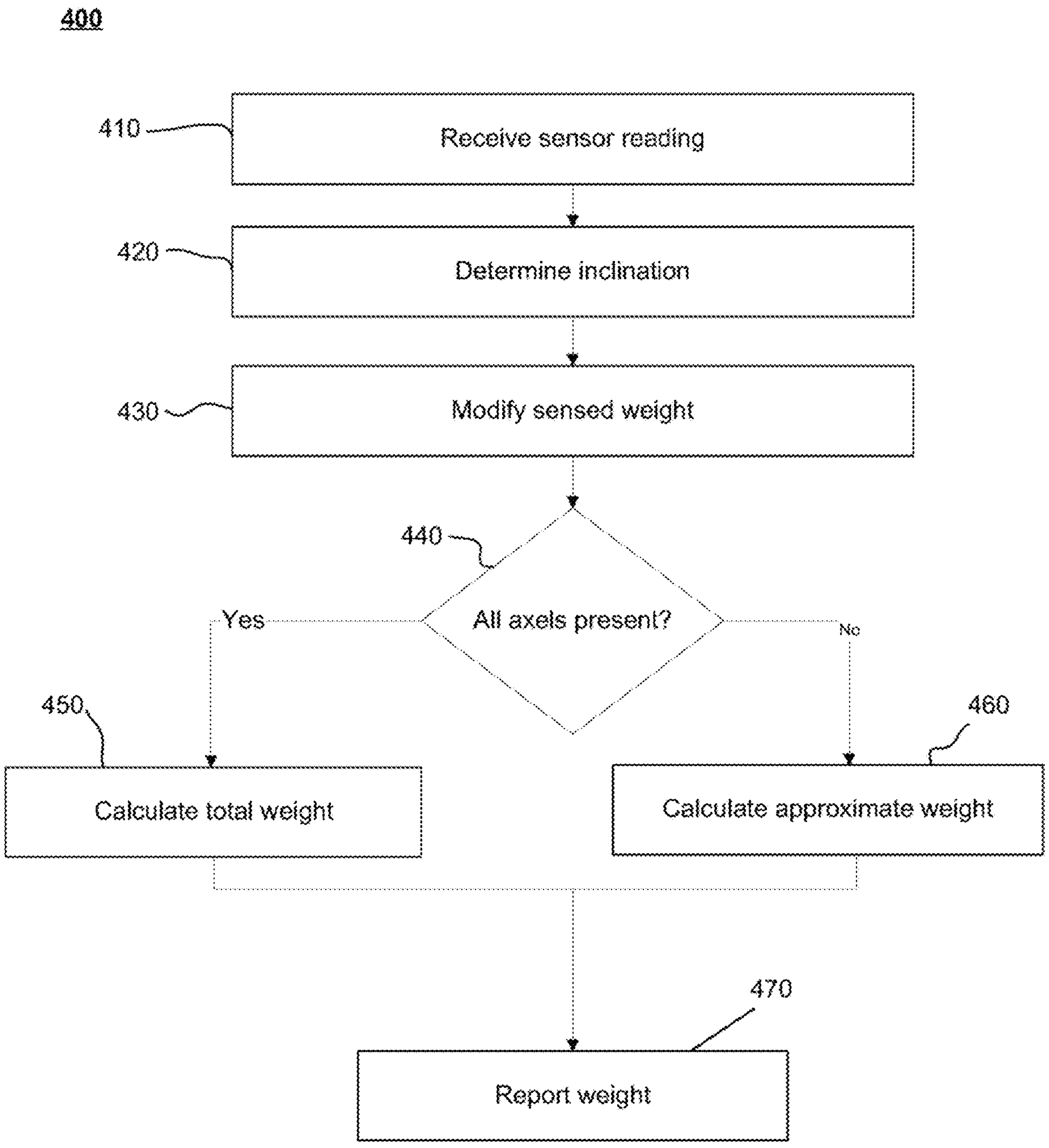
FIGS. 4-6 illustrates example methods according to aspects of the present disclosure.

FIG. 4 is a flowchart 400 of a method of sensing weight according to aspects of the present disclosure. The method may be performed by sensor controller 110. However, this may be merely an example and, in some cases, one or more aspects of the method may be performed partly or completely on a remote system (e.g., remote system 380) such as a server. Sensor controller 110 receives 410 sensor reading (s) from weight sensor(s) 130. The sensor readings may be received periodically, when a change exceeds a predetermined threshold, continuously, and/or on demand by the sensor controller 110. Sensor controller 110 then determines 420 an inclination of the chassis 180, for example, using tilt sensor 250. Then, based on the determined inclination, sensor controller 110 can modify the sensed weight to account for the inclination.

If a sensor reading has been provided by weight sensors 130 distributed at each axle (440—Yes), sensor controller 110 combines the plurality of sensor reading to calculate 450 the total weight of the cargo container 195 and/or the combined weight of the chassis 180 and cargo container 195. If a sensor reading has been provided by one or more weight sensors 130 only less than all axles (440—No), sensor controller 110 calculates 460 an approximate weight of the cargo container 195 and/or the approximate combined weight of the chassis 180 and cargo container 195. The sensor controller 110 may then report 470 the calculated weight (e.g., to remote system 380 via wireless transceiver 240).

One of ordinary skill will recognize that, in some cases, the determination of inclination may be done using alternative sensors. Additionally, in some cases, no determination of inclination may occur. In such cases, the flow of FIG. 4 would move from 420 to 440.

As will be understood by one of ordinary skill, it can be important to control the distance between the sensors 130 and the sensor controller 110. Longer connections are more likely to be noisy affecting the accuracy of the sensor readings. In some cases, it may be advantageous to combine sensors 130 with the sensor controller 110 and mount both directly on or near one or more axles. Alternatively, sensors on the axle(s) may be also equipped with gravity or tilt detection and relay that information to the sensor controller 110. The sensor controller may be able to measure the relative difference in tilt between the on axle sensor and the bottom of the chassis or the floor of the trailer. This difference (e.g., the tilt or incline, or the deflection of the chassis) can be used to further increase accuracy of the weight measurement.

In some cases, sensor controller 110 may determine whether the cargo container 195 has been added or removed from the chassis 180. For example, in addition to weight sensor readings, sensor controller 110 may monitor signal strength from the GPS receiver 260. A significant decrease in signal strength for the GPS signal (e.g., positioning signal) over a short period of time may indicate that the container 195 has been added, especially if coinciding with a significant increase in sensed weight from weight sensors 130. This is because sensor controller 110 may be disposed on a chassis 180 connected to the tractor 190, which is typically covered by the cargo container 195. Thus, when the cargo container 195 is added, the strength of the GPS signal decreases. Likewise, a significant increase signal strength for the GPS signal over a short period of time may indicate that the container 195 has been removed, especially if coinciding with a significant decrease in sensed weight from weight sensors 130.

One of ordinary skill will recognize that weight sensor readings change over time due to chassis or suspension wear, sensor wear, sensor displacement, and/or jarring of the weight sensors, etc. Accordingly, it is often desirable to regularly calibrate weight sensors 130. When sensor controller 110 determines that the cargo container 195 has been removed, it may automatically control calibration of the weight sensor(s) 130. Without the cargo container, the reading of the weight sensor(s) 130 may indicate a tare or unloaded weight. This tare reading may be used by the sensors 130 and/or sensor controller 110 to determine the weight of the cargo container 195 and/or cargo when the container 195 is placed on the chassis 180.

Figure 5:
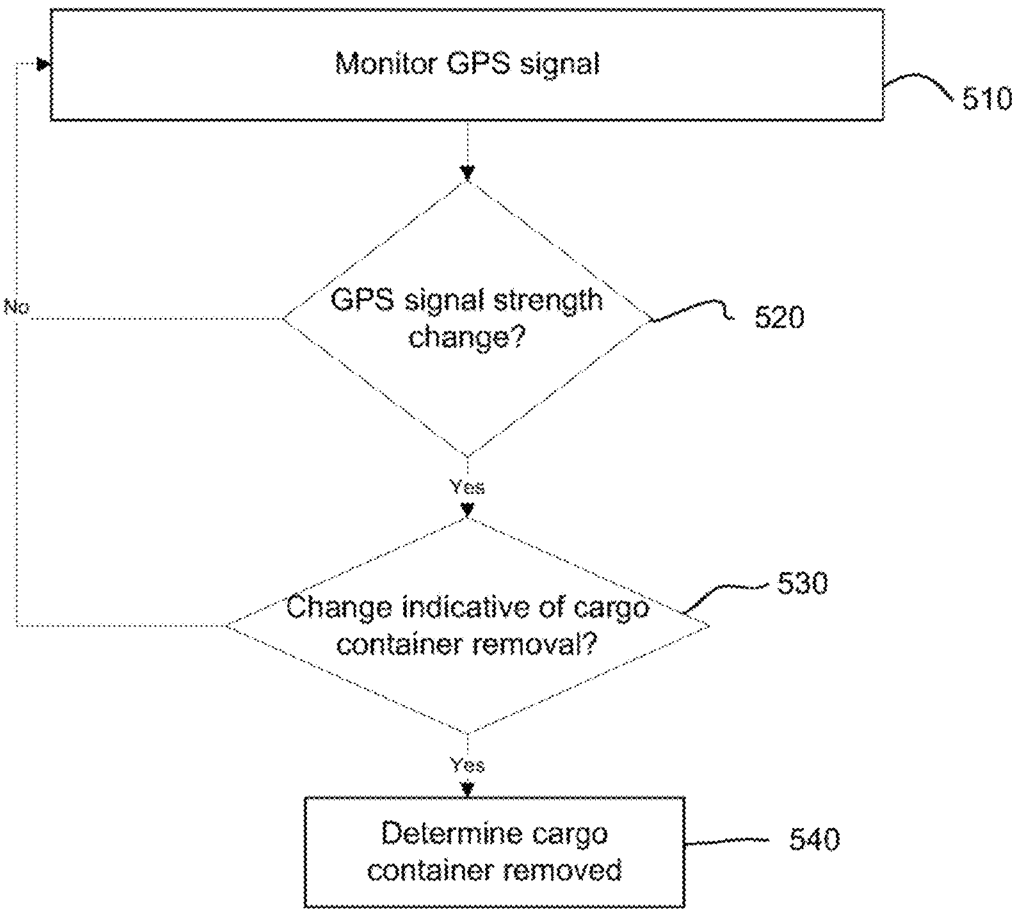

FIG. 5 is a flowchart 500 of an example method of determining whether a cargo container 195 is on a chassis 180. The method may be performed by sensor controller 110. However, this may be merely an example and, in some cases, one or more aspects of the method may be performed partly or completely on a remote system (e.g., remote system 380) such as a server. Sensor controller 110 monitors 510 a GPS signal strength of a GPS receiver disposed on chassis 180 (e.g., of GPS receiver 260). If a GPS signal strength changes (620—Yes), sensor controller 110 determines 530 whether the change is indicative of cargo container 195 being removed from chassis 180. For example, a GPS receiver (e.g., of GPS receiver 260) may be mounted on a chassis 180. When a cargo container 195 is positioned on cargo chassis 180, the GPS signal may travel through or around the cargo container 195 to reach the GPS receiver. Accordingly, a weaker GPS signal may be indicative of the presence of a cargo container 195, while a stronger GPS signal may be indicative of the absence of a cargo container 195. Accordingly, if the GPS signal strength rapidly increases, sensor controller 110 may determine 540 that the cargo container 195 has been removed.

One of ordinary skill will recognize that this is merely an example and, in some implementations, various additional or alternative other factors may be used to determine whether cargo container 195 has been removed. In some cases, GPS coordinates may be used to determine if the cargo container 195 has been removed. For example, if the GPS signal strength rapidly increases, but GPS coordinates indicate that the cargo chassis 180 just emerged from a tunnel, the rapid increase may be attributable to exiting the tunnel and not to the removal of the cargo container 195. Similarly, if GPS coordinates indicate that cargo chassis 180 is at a shipping yard or other location where the cargo container 195 is likely to be removed, a threshold GPS signal increase may be lowered. Additionally, historical GPS signal strength may be used to determine whether the cargo container 195 has been removed. For example, if GPS signal strength typically predictably varies along a particular route or at a specific location, outlier increases may be indicative of cargo container 195 removal. In some embodiments, the algorithm may monitor the GPS signal strength as it travels over some distance to ensure that the changes in GPS signal strength are not local to a specific geographic location with more obstructed GPS signal strength such as an urban canyon, tunnel, multi-level bridge, extended canopy, or awning. In some cases, weight measurements from weight sensors 130 may also be used to determine whether the cargo container 195 has been removed. One of ordinary skill will recognize that these are merely examples, and various other factors or conditions may be used to determine 540 whether the cargo container 195 has been removed.

Figure 6:
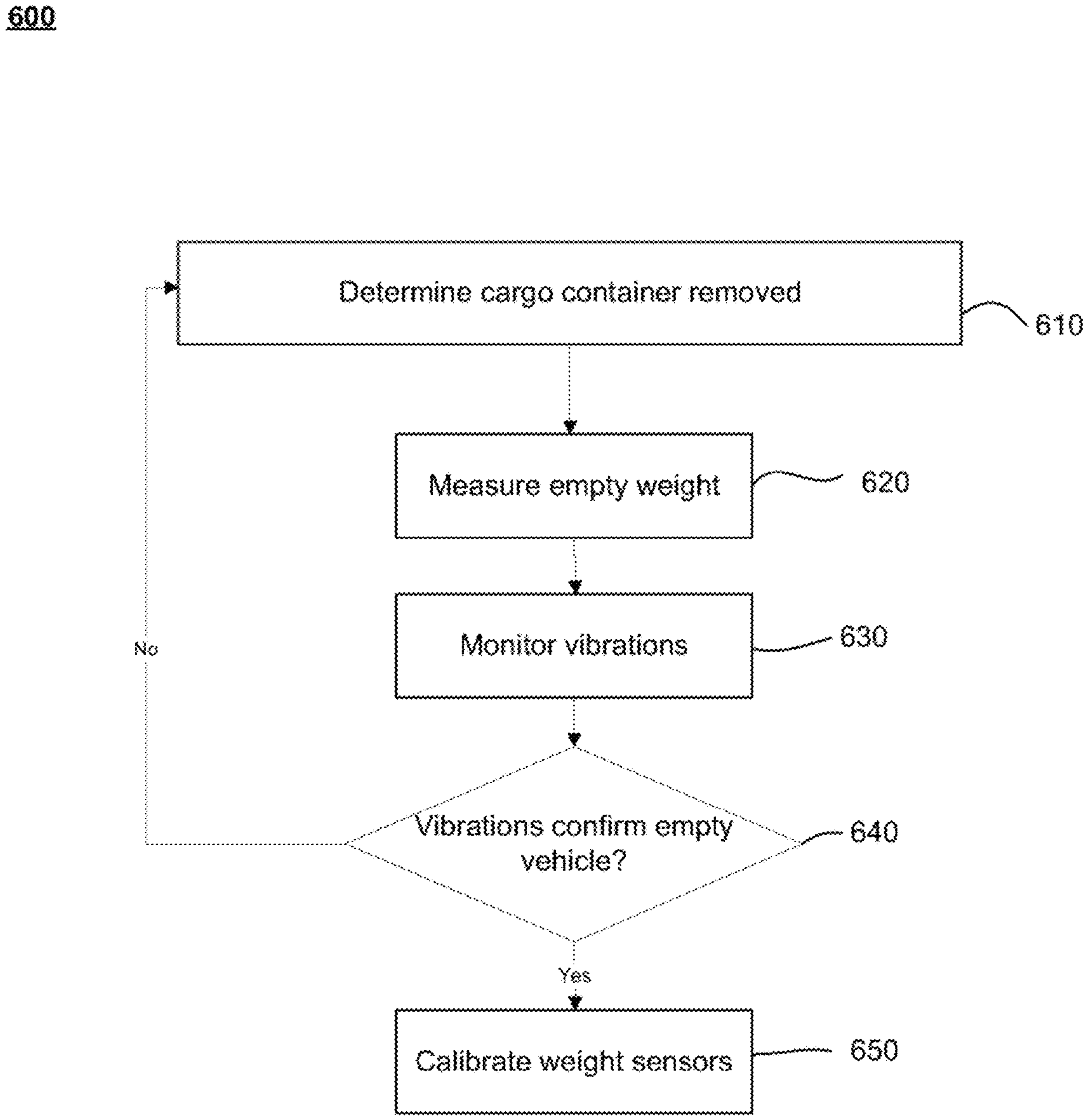

FIG. 6 is a flowchart 600 of a method of automatically calibrating a weight sensor according to aspects of the present disclosure. The method may be performed by sensor controller 110. However, this may be merely an example and, in some cases, one or more aspects of the method may be performed partly or completely on a remote system (e.g., remote system 380) such as a server. Sensor controller 110 determines 610 that the cargo container 195 has been removed from the cargo chassis 180. For example, sensor controller 110 may monitor weight measurements from weight sensors 130 to determine that a current measured weight is below a predetermined threshold. In some cases, sensor controller 110 may monitor GPS signal strength (e.g., from a GPS receiver) and determine that a rapid increase in GPS signal strength is attributed to the removal of the cargo container 195, for example, as described above with reference to FIG. 5.

Once sensor controller 110 determines 610 that the cargo container 195 has been removed from the cargo chassis 180, sensor controller 110 may measure 620 an empty (unloaded or tare) weight for the cargo chassis 180. Sensor controller 110 may monitor 630 vibrations of the chassis 180, for example, using tilt sensor 250 to verify 640 whether the chassis 180 is empty. For example, when cargo container 195 is loaded onto chassis 180, vibrations would be dampened. Accordingly, greater vibrations when the vehicle 190 is moving would be indicative that the vehicle 190 does not have a loaded cargo container 195. Once the vibrations confirm the cargo container 195 has been removed (640—Yes), sensor controller 110 may calibrate 650 the weight sensors 130 based on the empty weight reading.

One of ordinary skill will recognize that the method of FIG. 6 is merely an example. In some cases, the system may determine that the cargo container has been removed and calibrate the weight sensors based thereon. In such cases, no monitoring of vibrations may occur, and the flow of FIG. 4 would move from 610 to 650 or from 620 to 650.

Figure 7:
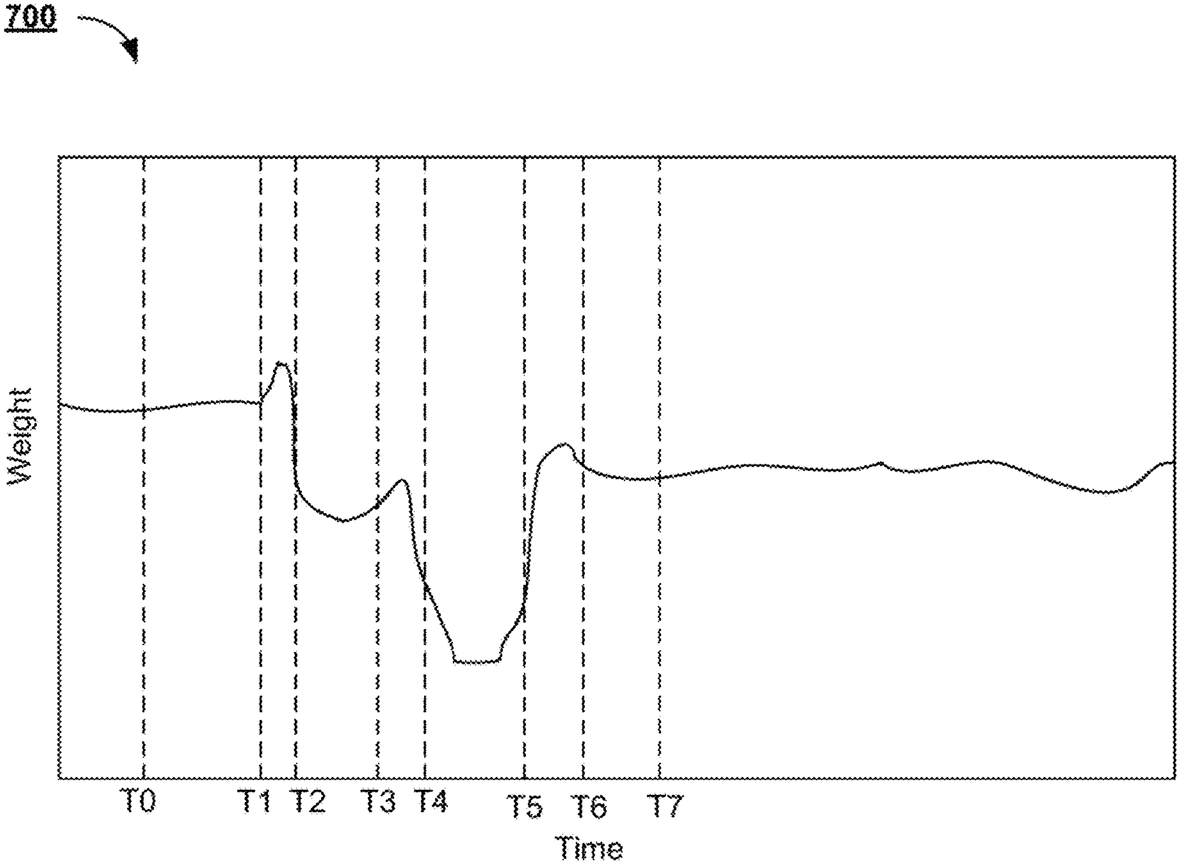
FIG. 7 is a graphical representation of sensed weight over time.

In some cases, weight sensors 130 may be monitored to determine loading and unloading behavior and time. An example graph 700 of weight sensed variations over time is depicted in FIG. 7. At time TO, cargo vehicle 190 may be at rest at a stationary location (e.g., a loading dock). At T1, a sensed weight rapidly increases, for example, indicative of a forklift and driver boarding the cargo container 195. At T2, a sensed weight rapidly decreases, indicative of the forklift, driver, and set of cargo being removed from cargo container 195. At T3, the sensed weight may again rapidly increase, indicative of the forklift and driver reentering the cargo container 195. At T4, the weight may rapidly decrease, indicative of the forklift, driver, and a second load of cargo moving from the cargo container 195. At T5, the sensed weight may rapidly increase to a level greater than a forklift and driver, for example, indicative of new cargo being loaded onto cargo container 195. At T6, the sensed weight may rapidly decrease to a level indicative of the forklift and driver leaving the cargo container 195 without a load of cargo. At T7, the cargo vehicle 190 may be indicated as in motion (e.g., via GPS), indicative of leaving the location. Accordingly, by analyzing the sensed weight over time, an unloading time may be determined to be from T1-T4, a reloading time from T4 to T6, and a total time at rest from TO-T7.

In some examples, the amount of weight removed from the cargo container 195 can be tracked and compared to a threshold weight to determine if the proper cargo was removed from the cargo container 195. For example, if less than the entire load of the cargo container 195 should be unloaded from the cargo container 195 at a certain location, the weight of each delivery can be tracked to determine if the correct cargo was delivered at each given location. If a greater or lesser amount of weight is removed from the cargo container at a given location than should have been removed, the disclosed technology can flag this variance and output an alarm or otherwise notify the driver, the delivery location, at dispatch team, etc. of the variance. Similarly, the disclosed technology can be used to track the weight of cargo loaded onto the cargo container 195. For example, if the expected weight of cargo that should be loaded onto the cargo container 195 is known, the disclosed technology can track the weight added to the cargo container 195 at a given location and flag any variance in the expected load. In this way, the disclosed technology can be used to track whether the correct cargo was added or removed from the cargo container 195 at each location.

Figure 8:
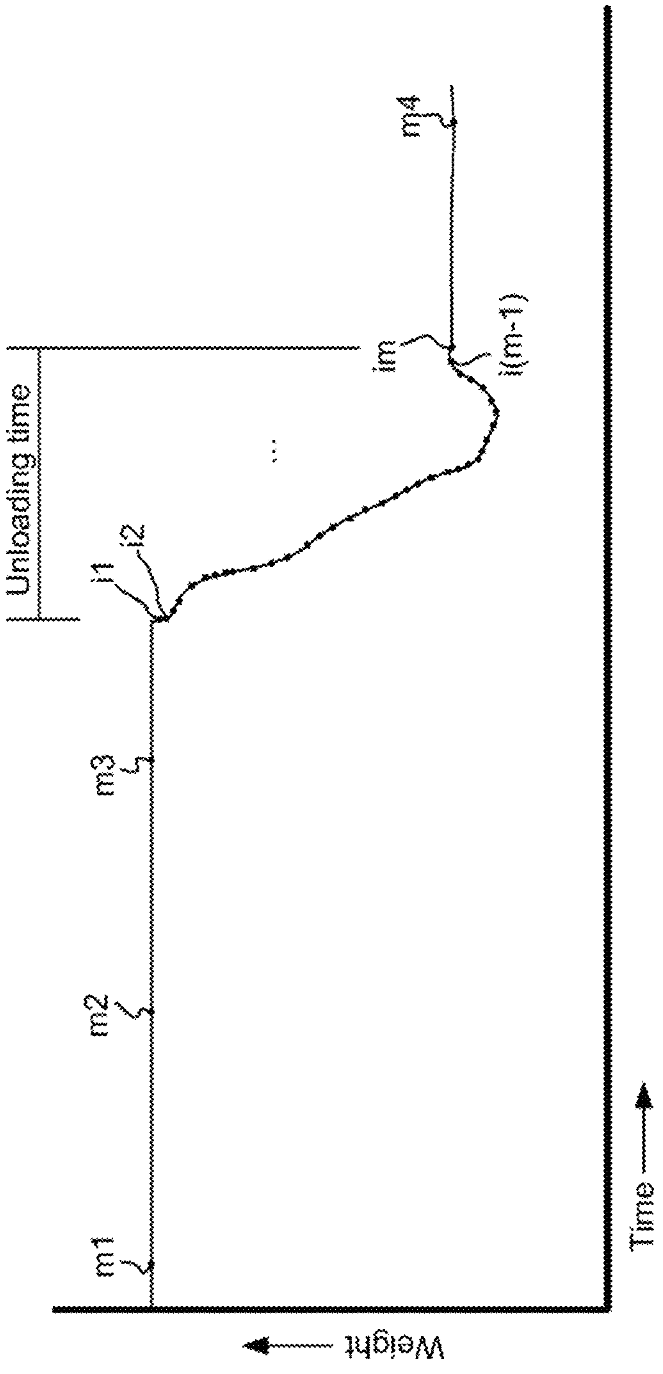
FIG. 8 is a graphical representation of sensed weight over time.

FIG. 8 is another example of a graph 800 of weight sensed over time. In some cases, the weight sensors may periodically take a weight measurement reading (e.g., m1, m2, m3, and m4). Additionally, or internally, a weight reading may be taken any time an impact is detected (e.g., i1, i2, . . . , i(m−1), and im). A controller (e.g., sensor controller 110 or remote system 380) may monitor weight measurements and look for patterns within the measurements to determine load and unload times. For example, measurement i1 may be the beginning of an unloading process, and im may be an end of an unloading process. The controller may determine that the unloading time is from i1 to im by analyzing the weight measurements and timing of measurements i1 through im. In some cases, positioning information (e.g., GPS data) may be used in conjunction with the measurement information. For example, when GPS data indicates that the chassis is stationary or at a predetermined location (e.g., a loading bay), the impact sensor triggering impact readings may have increased sensitivity to allow the system to take more weight measurements and thus increase its responsiveness and time resolution and accuracy in determining loading and unloading times.

In some cases, a processor (e.g., processor 210 of sensor controller 110 or a processor of remote system 380) may monitor weight readings to determine a data pattern corresponding to loading and/or unloading. In some cases, machine learning and/or a neural network may analyze the data to determine when and for how long loading and unloading of a container takes.

One of ordinary skill will recognize that, based on the weight sensor readings and/or GPS reading over time, various measurements may be determined, recorded, and/or reported. For example, as discussed above, a controller may determine unloading event duration based on a start and stop time for unloading based on the weight sensor readings. Likewise, a controller may determine loading event duration based on a start and stop time for loading based on the weight sensor readings. In some cases, a controller may determine a time between unloading and loading (e.g., an end of unloading to a beginning of loading, an end of unloading to an end of loading, a beginning of unloading to a beginning of loading, or a beginning of unloading to an end of loading). Additionally, the controller may determine waiting or “dwelling” time before loading or unloading starts. For example, if a full container is moved to a loading dock, the time between arriving at the dock and a beginning of unloading may be determined by using GPS coordinates (to determine movement and/or positioning) and the weight measure sensors. Further, the controller may determine waiting or “dwelling” time after loading or unloading ends. For example, once loading or unloading of a full container at a loading dock is completed, the time between completion and leaving the dock may be determined by using GPS coordinates (to determine movement and/or positioning) and the weight measure sensors. Similar calculations may be made when bounded by the detected movement of the chassis/container combo or the trailer. Beginning of the dwell time measurements may be bound by the chassis/container combo or the trailer stop. The end of the dwell time may be determined based on the start of movement of the chassis/container combo or the trailer.

In some cases, a controller may utilize a camera (e.g., a freight camera installed in the cargo space) to determine, record, and/or report various measurements related to cargo handling. For example, the camera may periodically capture images and/or capture images in response to a signal or impulse. By analyzing the images (e.g., with machine learning), starts and stops time of for loading and unloading may be determined. In some cases, a controller may determine a time between unloading and loading (e.g., an end of unloading to a beginning of loading, an end of unloading to an end of loading, a beginning of unloading to a beginning of loading, or a beginning of unloading to an end of loading). Additionally, the controller may determine waiting or "dwelling" time before loading or unloading starts. For example, if a full container is moved to a loading dock, the time between arriving at the dock and a beginning of unloading may be determined by using GPS coordinates (to determine movement and/or positioning) and the camera images. Further, the controller may determine waiting or "dwelling" time after loading or unloading ends. For example, once loading or unloading of a full container at a loading dock is completed, the time between completion and leaving the dock may be determined by using GPS coordinates (to determine movement and/or positioning) and the camera images.

In some cases, a controller may utilize an accelerometer (e.g., an accelerometer installed in or near the cargo space) to determine, record, and/or report various measurements related to cargo handling. For example, accelerometer may capture acceleration readings (e.g., periodically or by impulse). By analyzing these readings (e.g., with machine learning), starts and stops time of for loading and unloading may be determined. In some cases, a controller may determine a time between unloading and loading (e.g., an end of unloading to a beginning of loading, an end of unloading to an end of loading, a beginning of unloading to a beginning of loading, or a beginning of unloading to an end of loading). Additionally, the controller may determine waiting or "dwelling" time before loading or unloading starts. For example, if a full container is moved to a loading dock, the time between arriving at the dock and a beginning of unloading may be determined by using GPS coordinates (to determine movement and/or positioning) and the accelerometer readings. Further, the controller may determine waiting or "dwelling" time after loading or unloading ends. For example, once loading or unloading of a full container at a loading dock is completed, the time between completion and leaving the dock may be determined by using GPS coordinates (to determine movement and/or positioning) and the accelerometer readings.

In all above cases, the time of the loading/unloading activity start may, in some cases, be defined as the time of opening the cargo space door or the time of first movement of cargo. Similarly, the time of the loading/unloading activity end may, in some cases, be determined by the time the closing of the cargo space door or the time of last movement of cargo. If the door opening and/or closing is used to determine beginning and end times of the loading/unloading activity, a door sensor may be used to determine the state of the door being open or close and/or to detect the act of opening and closing the doors.

In some cases, a system (e.g., remote system 380), may compile a plurality of instances (e.g., at a distribution center, by shift, and/or by loading dock). For example, the system can compile individual instances trip data including loading times, unloading times, dwell times (e.g., before and after), and/or time between loading and unloading. Based on this data, the system may generate a score (e.g., for each distribution center, a period of time at the distribution center, and/or a loading bay) that reflects its efficiency in equipment operation. For example, average loading times, unloading times, dwell times (e.g., before and after), and/or time between loading and unloading may be determined and used in generating the efficiency score. The system may further generate various metrics, e.g., used for rating and/or ranking the distribution centers, shifts, and/or loading bays, such as average, standard deviation, and $90^{th}$ percentile threshold, for loading times, unloading times, dwell times (e.g., before and after), and/or time between loading and unloading, as well as similar metrics for the overall efficiency scores. The disclosed technology can output periodically a report summarizing the efficiency of each driver, loading/unloading crew, warehouse, etc. so that the efficiency of the loading or unloading process can be tracked. If certain drivers, loading/unloading crews, or warehouses are below a predetermined threshold, the disclosed technology can output a report to notify management that the identified driver, loading/unloading crew, or warehouse is operating at a less than desirable efficiency.

In some examples, the time it take to load or unload the container can be tracked and one or more notifications can be sent to the driver, the loading/unloading crew, the warehouse, a remote dispatcher etc. to indicate that the loading or unloading of the container is taking too long. For example, if the loading is taking longer than a predetermined load time, the disclosed technology can output a notification to inform the warehouse that the loading is taking too long. In some examples, the notification can include a notification to forklift operators informing additional forklift operators to come help load the container to help expedite the loading process.

In some cases, GPS may be used to determine or approximate an inclination level. In some cases, GPS may be used to determine a location where the chassis is substantially flat, thereby eliminating the need for inclination calculations. For example, shipping depots have designated slots for vehicles to load and unload cargo containers. These locations are exceptionally level to promote fast, efficient, and safe loading and unloading of the containers. A vehicle entering the shipping depot loaded with a cargo container will move to a slot, have the cargo container removed and a new cargo container added, typically in a matter of minutes. Thus, when a chassis experiences a significant weight drop within a shipping depot (or a lowest weight point measured when the vehicle is in the shipping depot), it indicates that the cargo container has been removed while the chassis is unloaded, on a flat surface, and not using landing gear (see, e.g., FIG. 9 (988)). The measurement at this point can be used to calibrate the weight sensors. Accordingly, by tracking weight measurements while the chassis is in the geofenced shipping depot, calibration of the weight sensors can be effectively and automatically conducted.

Additionally, in some cases, implementations may incorporate multiple weight sensors to calculate the actual weight on various wheels. For example, weight sensors can be connected to each wheel, which directly sense the weight transferred to each wheel. In some cases, pressure sensors may be applied to fix points on a chassis (e.g., each axle). The local pressure values can be combined to calculate the weight of the cargo. This can provide a more accurate weight measurement. In some cases, a weight sensor may also be connected to the fifth wheel (i.e., the connection point between the tailer and tractor) (see, e.g., FIG. 9, 986). In some cases, the weight measurements (and changes thereof) can be used to help determine the inclination of the chassis (e.g., together with the tilt sensor). For example, increases in weight measurements from front sensors and decrease in weight measurements from back sensors would indicate a change in a decline in elevation, which may be indicative of parking on an incline, or, when happening suddenly and corresponding to weight shift, indicative of deploying the chassis/trailer landing gear.

In some examples, data from one or more weight sensors 130 can be used to determine whether the vehicle 190 meets certain weight limits. For example, as briefly described above, various jurisdictions (e.g., states) or locations (e.g., bridges) have weight limit requirements. The weight limit requirements can be by total vehicle weight and/or by weight per each axle. Exceeding these weight limits can lead to penalties, fines, and/or injury. Therefore, tracking whether the vehicle 190 meets a weight limit for a given jurisdiction or location can help reduce cost and prevent injury. To illustrate, as the cargo container 195 is loaded with cargo, the weight of the vehicle 190 can be tracked and compared to a threshold weight. The total weight of the vehicle 190 can be extrapolated with the weight of the added cargo. If the weight of the vehicle 190 exceeds the threshold weight, the sensor controller 110 can output a notification or alarm to notify the driver and/or a remote dispatcher that the weight of the vehicle 190 may exceed weight limits. The threshold weight, for example, can be the same as or a weight below the weight limit requirements of the jurisdiction or other locations that the vehicle 190 is expected to encounter on route to the next destination. If the threshold weight is exceeded, weight can either be removed from the cargo container 195 or a new route can be determined so that the vehicle 190 passes through jurisdictions or locations having higher weight limit requirements.

As another example, if the weight of the vehicle 190 is close to the threshold weight (e.g., is equal to the threshold weight or is less than or greater than the threshold weight by a predetermined amount), the sensor controller 110 can output a notification to the driver or a remote dispatcher suggesting the driver should weigh the vehicle 190 on a scale before proceeding. In this way, the driver can verify the actual (legal) weight of the vehicle 190 before proceeding to the next destination.

Additionally, in some cases, GPS data (e.g., positioning data) may be used together with weight measurements to determine whether a chassis is resting on landing gears. For example, sudden and/or swift increases in weight measurements from front sensors and decreases in weight measurements from back sensors without significant movement of the chassis would indicate the front end of the chassis is being lowered (e.g., onto landing gear). Likewise, sudden and/or swift decreases in weight measurements from front sensors and increases in weight measurements from back sensors without significant movement of the chassis would indicate the front end of the chassis is being raised (e.g., onto a truck). Further, if GPS data indicates the chassis is in a flat area (e.g., a loading yard), a change in the weight sensor measurements indicating a tilt change is more likely to be indicative of raising or lowering the front of the chassis.

In some cases, calibration should be made when the chassis is connected to a vehicle, as the relative stresses are different for connected and unconnected chassis. Accordingly, if a chassis is in movement and/or receives external power, it can be determined that the chassis is hooked up to a vehicle. That is, in some circumstances, the presence of power and/or movement can be used to distinguish between the chassis being unconnected (e.g., on landing gear) or being connected to a vehicle.

In some instances, unloaded weight measurements can be tracked over time. In some cases, the interpretation of the readings may be modified to calibrate to the drifting of measurements from the device.

In some cases, a single enclosure may contain a weight sensor (e.g., an axel sensor) and a processor. By combining all components in a single enclosure, it may be easier to minimize and/or compensate for noise in the sensor reading, thus improving weight measurement accuracy. Included within the package may be sensors to determine dislocation, tilt, or shifting of the sensor. For example, a gyroscopic sensor may be used to determine if the enclosure has tilted. Frequency sensors can more easily filter out noise in the system, but are somewhat less precise. In contrast capacitive or resistive sensors require much greater noise immunity, which can be provided by locating the sensor very close to the sensing location, but provide greater precision. Additionally, strain sensors may be used by sensing changes in the axle in the z-direction of FIG. 9 (i.e., up and down). The width direction (x-direction in FIG. 9) of the chassis is relatively stable. However, movement in the length direction (y-direction in FIG. 9) of the chassis can create measurement issues. Accordingly, in some cases, the enclosure may include sensors to sense shifting in the y-direction, which can then be compensated for.

In some cases, the chassis 180 may be extendable. For example, a portion of chassis 180 including front and back axles 982 and 984 may be movable relative to a portion of the chassis 180 including the fifth wheel 986. The system may be configured to determine when the chassis 180 is extended or compacted. In some cases, the weight sensor(s) 130 and/or sensor controller 110 may be attached to the portion of the chassis 180 including the front and/or back axels 982 and 984, and a tracker device 140 (e.g., a GPS device) may be attached to the portion of the chassis 180 including the fifth wheel. The tracker device may communicate with weight sensor(s) 130 and/or sensor controller 110 wirelessly, and signal strength can be monitored to determine whether the chassis is expanded or contracted. For example, if the signal strength suddenly worsens (e.g., while the chassis 180 is not in motion) it can be determined that the chassis 180 has been expanded.

Likewise, in some cases, the weight sensor(s) 130 may be attached to the portion of the chassis 180 including the front and/or back axels 982 and 984, and a tracker device (e.g., a GPS device) and/or sensor controller 110 may be attached to the portion of the chassis 180 including the fifth wheel. The weight sensor(s) 130 may communicate with the tracker device and/or sensor controller 110 wirelessly, and signal strength can be monitored to determine whether the chassis is expanded or contracted. For example, if the signal strength get suddenly improves (e.g., while the chassis 180 is not in motion) it can be determined that the chassis 180 has been contracted. Additionally, or alternatively, a geofence can be used to increase accuracy of this prediction. For example, the chassis 180 will typically only be adjusted when loading or unloading cargo. Thus, the expansion/contraction determination can be more sensitive in those geo-locations.

In certain instances, there may be provided a graphical user interface (GUI) for tracking one or more chassis, trailers, and/or cargo containers. For example, a plurality of sensor controllers 110 may report back statuses (e.g., mounted or unmounted, loaded or unloaded, percent loaded, total weight, etc.) to remote system 380. Remote system 380 may provide this information in a GUI. In some cases, the GUI may be a map with the location of the chassis, trailers, and/or cargo containers indicated on the map. The map may indicate a location and/or status of various chassis and trailers. In some cases, the GUI may provide an image feed of a cargo area. For example, a cargo camera may be included in a cargo area, and sensor controller 110 may transmit the image data to remote system 380. The images may be displayed in near-real time and/or may be captured periodically. By selecting a chassis or trailer on the GUI, an interface may be presented showing the inside of the cargo area.

In some cases, the GUI may indicate various statuses of the trailers or chassis. For example, the GUI may indicate (e.g., by highlighting or color) chassis or trailers that have not been used or moved within a certain period of time. As another example, the system may identify chassis with a container on (or trailers) that have been at certain locations, for example, a loading bay without a change of load status. If the container is still loaded, an alert can be provided indicating that the load has been at the unloading location for an almost exact amount of time and is ready to be unloaded. In other cases, if the container is reported as empty, a driver can be dispatched to go pick up the chassis with the container. One of ordinary skill will recognize that these are merely examples, and various alterations to the GUI may be provided without departing from the scope of the present disclosure.

Figure 10:
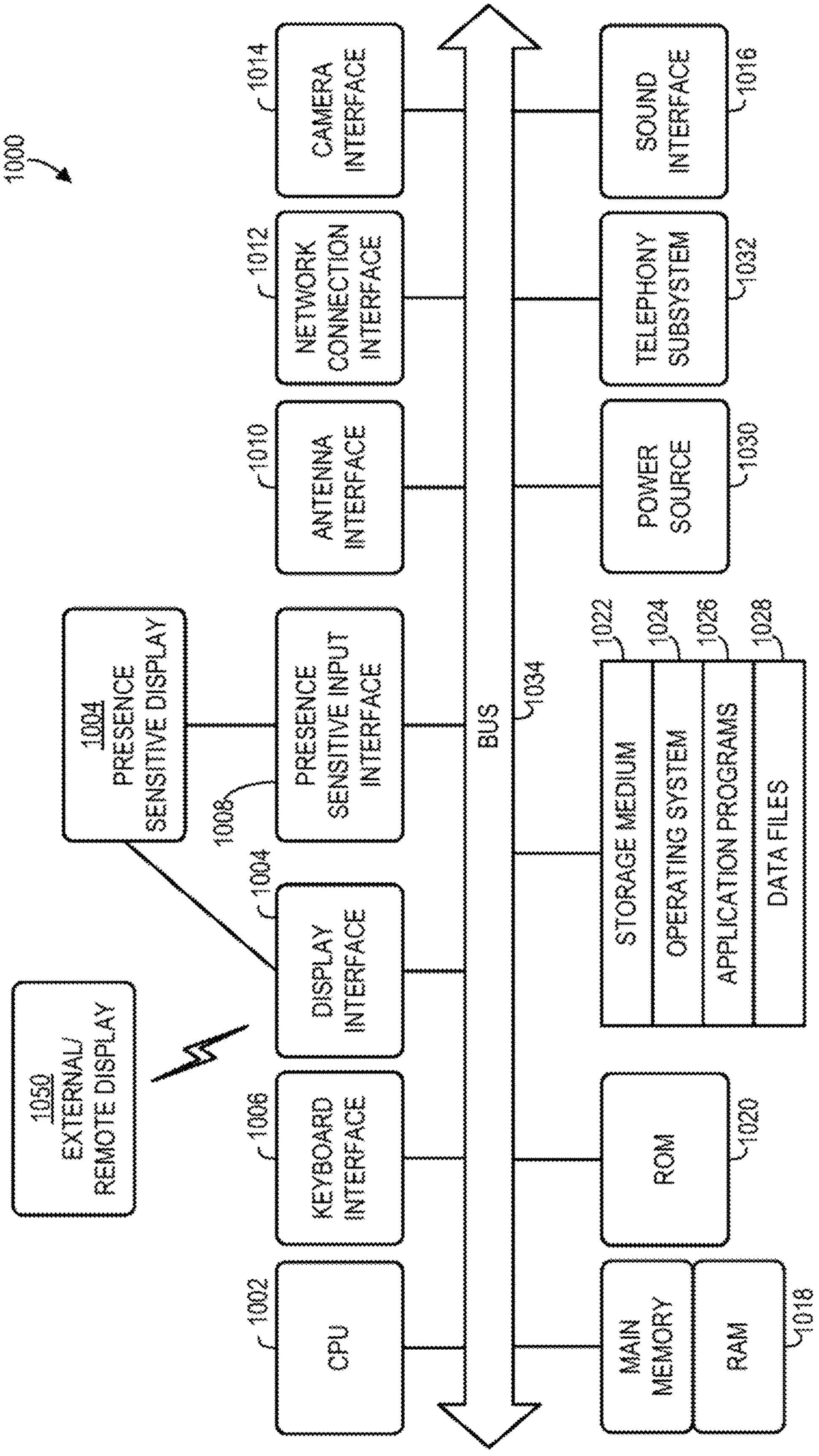
FIG. 10 is a block diagram of an illustrative system architecture.

FIG. 10 is a block diagram of an illustrative system architecture 1000, according to an example implementation. As non-limiting examples, portions of sensor controller 110, sensor(s) 120, server 280 may be implemented using one or more elements from the system architecture 1000. It will be understood that the device architecture 1000 is provided for example purposes only and does not limit the scope of the various implementations of the present disclosed systems, methods, and computer-readable mediums.

The computing device architecture 1000 of FIG. 10 includes a central processing unit (CPU) 1002, where computer instructions are processed, and a display interface 1004 that acts as a communication interface and provides functions for rendering video, graphics, images, and texts on the display. In certain example implementations of the disclosed technology, the display interface 1004 may be directly connected to a local display, such as a touch-screen display associated with a mobile computing device. In another example implementation, the display interface 1004 may be configured for providing data, images, and other information for an external/remote display 1050 that is not necessarily physically connected to the mobile computing device. For example, a desktop monitor may be used for mirroring graphics and other information that is presented on a mobile computing device. In certain example implementations, the display interface 1004 may wirelessly communicate, for example, via a Wi-Fi channel or other available network connection interface 1012 to the external/remote display 1050.

In an example implementation, the network connection interface 1012 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1004 may be operatively coupled to a local display, such as a touch-screen display associated with a mobile device. In another example, the display interface 1004 may be configured to provide video, graphics, images, text, other information, or any combination thereof for an external/remote display 1050 that is not necessarily connected to the mobile computing device. In one example, a desktop monitor may be used for mirroring or extending graphical information that may be presented on a mobile device. In another example, the display interface 1004 may wirelessly communicate, for example, via the network connection interface 1012 such as a Wi-Fi transceiver to the external/remote display 1050.

The computing device architecture 1000 may include a keyboard interface 1006 that provides a communication interface to a keyboard. In one example implementation, the computing device architecture 1000 may include a presence-sensitive display interface 1008 for connecting to a presence-sensitive display 1007. According to certain example implementations of the disclosed technology, the presence-sensitive display interface 1008 may provide a communication interface to various devices such as a pointing device, a touch screen, a depth camera, etc. which may or may not be associated with a display.

The computing device architecture 1000 may be configured to use an input device via one or more of input/output interfaces (for example, the keyboard interface 1006, the display interface 1004, the presence sensitive display interface 1008, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. As mentioned above, the display interface 1004 may be in communication with the network connection interface 1012, for example, to provide information for display on a remote display that is not directly connected or attached to the system. In certain implementations, a camera interface 1014 is provided that acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, a random-access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components.

According to an example implementation, the computing device architecture 1000 includes a telephony subsystem 1032 that allows the device 1000 to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 to execute software programs. Data may be stored in the RAM 1018, where the data may be accessed by the computer CPU 1002 during execution.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may include a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

An embodiment of the present disclosure may be implemented according to at least the following:

Clause 1: A sensor controller comprising: a processor; and a memory, the memory having stored thereon computer program code that, when executed by the processor, controls the processor to: receive one or more sensor readings from one or more weight sensors disposed on a cargo vehicle; determine an inclination of the cargo vehicle; modify the one or more sensor readings based on the inclination; and calculate a weight of cargo carried by the cargo vehicle based on the modified sensor reading.

Clause 2: The sensor controller of clause 1, wherein a single sensor reading is received from a single weight sensor, and the calculated weight of the cargo is an approximate calculated weight based on the single sensor reading.

Clause 3: The sensor controller of clauses 1 or 2, wherein a plurality of sensor readings are received from a plurality of weight sensors, at least one weight sensor of the plurality of weight sensors being disposed on each axle of the cargo vehicle.

Clause 4: The sensor controller of any of clauses 1-3, wherein the computer program code, when executed by the processor, further controls the processor to: determine that a cargo container has been removed from the cargo vehicle; automatically determine, based on readings of the one or more weight sensors, an empty weight of the cargo vehicle; and calibrate the weight sensors based on the determined empty weight.

Clause 5: The sensor controller of clause 4, wherein the computer program code, when executed by the processor, further controls the processor to verify the cargo vehicle is empty, before calibrating the weight sensors, by monitoring vibrations of the cargo vehicle when the cargo vehicle is in motion.

Clause 6: The sensor controller of any of clauses 1-5, wherein the computer program code, when executed by the processor, further controls the processor to determine that a cargo container has been removed from the cargo vehicle by: monitoring a GPS signal strength from a GPS receiver disposed on the cargo vehicle; detecting a change in the GPS signal strength; and determine that the change in the GPS signal strength is indicative of removal of the cargo container.

Clause 7: The sensor controller of any of clauses 1-6, wherein the computer program code, when executed by the processor, further controls the processor to: monitor sensor readings from the one or more weight sensors over time; and determine cargo unloading times based on changes to the sensor readings while the cargo vehicle is stopped.

Clause 8: The sensor controller of any of clauses 1-7, wherein the computer program code, when executed by the processor, further controls the processor to: monitor sensor readings from the one or more weight sensors over time; and determine cargo loading times based on changes to the sensor readings while the cargo vehicle is stopped.

Clause 9: The sensor controller of any of clauses 1-8, wherein the sensor controller is configured to disposed on a cargo vehicle configured to receive the one or more sensor readings from the one or more weight sensors locally.

Clause 10: The sensor controller of any of clauses 1-9, wherein the sensor controller is a server configured to receive the one or more sensor readings from the one or more weight sensors remotely.

Clause 11: A sensor controller comprising: a processor; and a memory, the memory having stored thereon computer program code that, when executed by the process, controls the processor to: receive one or more sensor readings from one or more weight sensors disposed on at least one from among a cargo vehicle, a cargo container, and a chassis.

Clause 12: The sensor controller of any of clauses 1-11, wherein the sensor controller is further configured to detect loading or unloading of the cargo container.

Clause 13: The sensor controller of clause 12, wherein the sensor controller is configured to detect loading or unloading of the cargo container based on a changes to the sensor readings.

Clause 14: The sensor controller of clause 12 or clause 13, wherein the sensor controller is configured to detect loading or unloading of the cargo container based on a determining a pattern of changes to the sensor readings.

Clause 15: The sensor controller of any of clauses 1-14, wherein the sensor controller is further configured to detect unauthorized loading or unloading of the cargo container based on a time of the detected loading or unloading.

Clause 16: The sensor controller of any of clauses 1-15, wherein the sensor controller is further configured to detect unauthorized loading or unloading of the cargo container based on a location of the detected loading or unloading.

Clause 17: The sensor controller of any of clauses 1-16, wherein a weight sensor of the one or more weight sensors are disposed on at least one axle of the chassis.

Clause 18: The sensor controller of any of clauses 1-17, wherein a weight sensor of the one or more weight sensors are disposed on each axle of the chassis.

Clause 19: The sensor controller of any of clauses 1-18, wherein a weight sensor of the one or more weight sensors is disposed on a fifth wheel of the chassis.

Clause 20: The sensor controller of any of clauses 1-19, wherein the sensor controller and the one or more weight sensors are disposed in a single enclosure.

Clause 21: The sensor controller of any of clauses 1-21, wherein the sensor controller is configured to extrapolate total weight of the cargo container based on a sensor reading of each weight sensor.

Clause 22: The sensor controller of any of clauses 1-21, wherein the sensor controller is configured to extrapolate total weight of the cargo container based on a sensor reading of a weight sensor disposed on each axle of the chassis.

Clause 23: The sensor controller of any of clauses 1-22, wherein the sensor controller is configured to determine that the chassis is empty based on a geo-location of the chassis.

Clause 24: The sensor controller of any of clauses 1-23, wherein the sensor controller is configured to determine that the chassis is empty based on a change in sensor readings of the one or more weight sensors.

Clause 25: The sensor controller of any of clauses 1-24, wherein the one or more weight sensors comprise a vibrating wire sensor.

Clause 26: The sensor controller of any of clauses 1-25, wherein the one or more weight sensors comprise a load cell sensor.

Clause 27: The sensor controller of any of clauses 1-26, wherein the one or more weight sensors comprise a frequency sensor.

Clause 28: The sensor controller of any of clauses 1-27, wherein the one or more weight sensors comprise a capacitive sensor.

Clause 29: The sensor controller of any of clauses 1-28, wherein the one or more weight sensors comprise a resistive sensor.

Clause 30: The sensor controller of any of clauses 1-29, wherein the one or more weight sensors comprise a strain sensor.

Clause 31: The sensor controller of clause 30, wherein sensor controller is further configured to detect at least one of dislocation of the axle in the y direction, tilt of the weight sensor, or shift of the weight sensor.

Clause 32: The sensor controller of clause 31, wherein sensor controller is further configured to compensate for the detected at least one of dislocation of the axle in the y direction, tilt of the weight sensor, or shift of the weight sensor.

Clause 33: The sensor controller of any of clauses 1-32, wherein the chassis is an extendable chassis.

Clause 34: The sensor controller of clause 33, wherein the sensor controller is further configured to determine whether the chassis is extended or contracted.

Clause 35: The sensor controller of clause 34, wherein the sensor controller is further configured to determine whether the chassis is extended based on a change of signal strength between at least one weight sensor and a location sensor.

Clause 36: The sensor controller of clause 34 or clause 35, wherein the sensor controller is further configured to determine whether the chassis is extended based on a change of signal strength between the sensor controller and a location sensor.

Clause 37: The sensor controller of any of clauses 34-36, wherein the sensor controller is further configured to determine whether the chassis is extended based on a change of signal strength between the sensor controller and at least one weight sensor.

Clause 38: The sensor controller of any of clauses 34-37, wherein the sensor controller is further configured to utilize a geofence to determine whether the chassis is extended based on a location of the chassis.

Clause 39: The sensor controller of any of clauses 1-38, wherein the sensor controller is remote from the chassis.

Clause 40: The sensor controller of clause 39, wherein the sensor controller receives weight readings in real time.

Clause 41: The sensor controller of any of clauses 1-38, wherein the sensor controller is remote disposed on the chassis.

Clause 42: The sensor controller of clause 40 or clause 41, wherein the sensor controller transmits weight readings to a remote server in real-time.

Clause 43: The sensor controller of any of clauses 1-42, wherein the at least one weight sensors detect sensor readings periodically.

Clause 44: The sensor controller of any of clauses 1-43, wherein the at least one weight sensors detect sensor readings based on an impulse from an impact sensor.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor controller comprising:
a processor; and
a memory, the memory having stored thereon computer program code that, when executed by the processor, controls the processor to:
receive weight data from one or more weight sensors disposed on a cargo vehicle;
determine that cargo has been removed from the cargo vehicle;
determine, based on the weight data, an empty weight of the cargo vehicle;
calibrate the one or more weight sensors based on the empty weight; and
extrapolate total weight of the cargo vehicle based on the weight data.

2. The sensor controller of claim 1, wherein the computer program code, when executed by the processor, further controls the processor to:
determine an inclination of the cargo vehicle; and
calculate a weight of cargo carried by the cargo vehicle based on the weight data and the inclination of the cargo vehicle.

3. The sensor controller of claim 2, wherein the computer program code, when executed by the processor, further controls the processor to calibrate the one or more weight sensors based on the empty weight and the inclination of the cargo vehicle.

4. The sensor controller of claim 1, wherein the computer program code, when executed by the processor, further controls the processor to verify the cargo vehicle is empty, before calibrating the weight sensors, by monitoring vibrations of the cargo vehicle when the cargo vehicle is in motion.

5. The sensor controller of claim 1, wherein the computer program code, when executed by the processor, further controls the processor to determine that a cargo container has been removed from the cargo vehicle by:
monitoring a Global Positioning System (GPS) signal strength from a GPS receiver disposed on the cargo vehicle;
detecting a change in the GPS signal strength; and
determining that the change in the GPS signal strength is indicative of removal of the cargo container.

6. The sensor controller of claim 1, wherein the computer program code, when executed by the processor, further controls the processor to:
monitor weight data from the one or more weight sensors over time; and
determine cargo unloading times based on changes to the weight data while the cargo vehicle is stopped.

7. The sensor controller of claim 1, wherein the computer program code, when executed by the processor, further controls the processor to detect loading or unloading of the cargo vehicle based on determining a pattern of changes to the weight data.

8. The sensor controller of claim 7, wherein the computer program code, when executed by the processor, further controls the processor to detect unauthorized loading or unloading of the cargo vehicle based on a time of the detected loading or unloading.

9. The sensor controller of claim 7, wherein the computer program code, when executed by the processor, further controls the processor to detect unauthorized loading or unloading of the cargo vehicle based on a location of the detected loading or unloading.

10. The sensor controller of claim 7, wherein the computer program code, when executed by the processor, further controls the processor to detect unauthorized loading or unloading of the cargo vehicle based on the weight data and a predetermined weight of cargo on the cargo vehicle.

11. The sensor controller of claim 1, wherein the computer program code, when executed by the processor, further controls the processor to:
compare the total weight of the cargo vehicle to a predetermined weight limit; and
in response to determining that the total weight of the cargo vehicle is greater than or equal to the predetermined weight limit, output a notification indicative of the total weight of the cargo vehicle being greater than or equal to the predetermined weight limit.

12. The sensor controller of claim 11, wherein the predetermined weight limit is based on a weight limit of a location through which the cargo vehicle is expected to pass.

13. The sensor controller of claim 1, wherein the sensor controller determines a deflection of the cargo vehicle based on data received from an accelerometer.

14. The sensor controller of claim 1, wherein the weight data is received from a plurality of weight sensors, at least one weight sensor of the plurality of weight sensors being disposed on each axle of the cargo vehicle.

15. A system comprising:
a weight sensor disposed on a cargo vehicle; and
a controller in communication with the weight sensor, the controller comprising a processor and a memory having instructions stored thereon that, when executed by the processor, cause the controller to:
receive first weight data from the weight sensor, the first weight data being indicative of a weight of a cargo container at a first time;
receive second weight data from the weight sensor, the second weight data being indicative of a weight of a cargo container at a second time;
determine a change in weight of the cargo container based on the first weight data and the second weight data;
determine whether the cargo container is being loaded or unloaded based on the change in weight;
in response to determining that the cargo container is being unloaded, receive empty weight data from the weight sensor;

determine, based on the empty weight data, an empty weight of the cargo vehicle; and calibrate the weight sensor based on the determined empty weight.

16. The system of claim 15, wherein the instructions, when executed by the processor, further cause the controller to:

determine an inclination of the cargo vehicle; and calculate a weight of cargo carried by the cargo vehicle based on the first weight data, the second weight data, and the inclination.

17. The system of claim 15 further comprising a location sensor disposed on the cargo vehicle, wherein the instructions, when executed by the processor, further cause the controller to detect unauthorized loading or unloading of the cargo vehicle based on a location of the cargo vehicle.

18. The system of claim 15, wherein the instructions, when executed by the processor, further cause the controller to determine cargo loading or unloading times based on the first weight data and the second weight data while the cargo vehicle is stopped.

19. A sensor controller comprising:

a processor; and a memory, the memory having stored thereon computer program code that, when executed by the processor, controls the processor to:

receive weight data from one or more weight sensors disposed on a cargo vehicle;

determine that cargo has been removed from the cargo vehicle;

determine, based on the weight data, an empty weight of the cargo vehicle;

calibrate the one or more weight sensors based on the empty weight; and detect loading or unloading of the cargo vehicle based on determining a pattern of changes to the weight data.

20. The sensor controller of claim 19, wherein the computer program code, when executed by the processor, further controls the processor to detect unauthorized loading or unloading of the cargo vehicle based on at least one of a time of the detected loading or unloading, a location of the detected loading or unloading, or a predetermined weight of cargo on the cargo vehicle.

* * * * *